United States Patent
Katsurada et al.

(10) Patent No.: US 8,653,680 B2
(45) Date of Patent: Feb. 18, 2014

(54) POWER GENERATION CONTROL APPARATUS

(75) Inventors: Keisuke Katsurada, Chiyoda-ku (JP);
Tatsuki Kouwa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/698,338

(22) PCT Filed: Aug. 30, 2010

(86) PCT No.: PCT/JP2010/064706
§ 371 (c)(1),
(2), (4) Date: Nov. 16, 2012

(87) PCT Pub. No.: WO2012/029104
PCT Pub. Date: Mar. 8, 2012

(65) Prior Publication Data
US 2013/0056983 A1 Mar. 7, 2013

(51) Int. Cl.
*H02P 9/00* (2006.01)
(52) U.S. Cl.
USPC .......................................................... 290/7
(58) Field of Classification Search
USPC .......................................................... 290/7
See application file for complete search history.

(56) References Cited

U.S. PATENT DOCUMENTS

| 7,368,893 B2 * | 5/2008 | Tsuzuki | 322/28 |
| 8,125,195 B2 * | 2/2012 | Kouwa | 322/28 |
| 2009/0218889 A1 | 9/2009 | Kouwa | |

FOREIGN PATENT DOCUMENTS

| JP | 11-191996 A | 7/1999 |
| JP | 3137247 B2 | 2/2001 |
| JP | 2009-213222 A | 9/2009 |

OTHER PUBLICATIONS

International Search Report for PCT/JP2010/064706 dated Nov. 22, 2010.

* cited by examiner

*Primary Examiner* — Tho D Ta
(74) *Attorney, Agent, or Firm* — Sughrue Mion, PLLC

(57) ABSTRACT

When electric generators operate in parallel, field current control operations thereof are synchronized thereby to equalize load balance therebetween. A first power generation control device connected to a main electric generator and a second power generation control device connected to a subordinate electric generator are each provided with an external sensing terminal that detects an external voltage of each electric generator to which itself belongs, an output sensing terminal that detects a power generation voltage generated by each electric generator itself, and the external output terminal that outputs a signal synchronized with a field current control signal for each field coil of each electric generator. When the plurality of electric generators are caused to drive at the same time, the external output terminal of the first power generation control device and the external sensing terminal of the second power generation control device are connected to each other.

7 Claims, 8 Drawing Sheets

US 8,653,680 B2

POWER GENERATION CONTROL APPARATUS

CROSS REFERENCE TO RELATED APPLICATIONS

This application is a National Stage of International Application No. PCT/JP2010/064706 filed Aug. 30, 2011, the contents of which are incorporated herein by reference in their entirety.

TECHNICAL FIELD

The present invention relates to a power generation control apparatus for a vehicle electric generator (hereinafter referred to simply as an "electric generator") which is driven by an internal combustion engine, and in particular to a power generation control apparatus which carries out field current control on a field coil, in cases where a plurality of electric generators are installed for one internal combustion engine and are made to operate in parallel with respect to one another at the same time.

BACKGROUND ART

FIG. 7 is a block diagram which shows a conventional power generation control apparatus together with an electric generator ACG.

In FIG. 7, the electric generator ACG is composed of a stator coil 1, a field coil 2 that is driven to rotate by means of an internal combustion engine (not shown), and a three phase full wave rectifier 3.

The three phase full wave rectifier 3 has an output end A connected to a positive terminal of a battery 5, an electric load 7, and a power generation control device 400, and the field coil 2 is connected to the power generation control device 400.

The power generation control device 400 is provided with an output sensing terminal a, a terminal b for starting (hereinafter referred to as a starting terminal), an external sensing terminal c, an external output terminal d, a terminal e for ground, and a terminal f for field current control.

In the power generation control device 400, the output sensing terminal a is connected to the output end A of the electric generator ACG and the positive terminal of the battery 5, and the starting terminal b is connected to the positive terminal of the battery 5 through a key switch 6. The external sensing terminal c is directly connected to the positive terminal of the battery 5. The terminal f is connected to the field coil 2 of the electric generator ACG, and the terminal e is grounded, together with the three phase full wave rectifier 3.

The power generation control device 400 is provided with a series circuit which is composed of a transistor 401 for switching (hereinafter referred to as a switching transistor 401) and a reflux diode 402 which are inserted between the output sensing terminal a and the terminal e so as to conduct and interrupt a field current to the field coil 2.

From the external output terminal d of the power generation control device 400, an electric potential, which is obtained by voltage dividing the electric potential of the terminal f by resistances 403, 404, is outputted as a signal which is in synchronization with a field current control signal from the terminal f.

In addition, the power generation control device 400 is provided with a NOR circuit 405 connected to a gate terminal of the switching transistor 401, comparators 406, 407 connected to an input terminal of the NOR circuit 405, resistances 408, 409 which serve to voltage divide a reference power supply voltage V thereby to generate an inverting input voltage (−) to the comparator 406, resistances 412, 413 which serve to voltage divide the voltage of the external sensing terminal c thereby to generate a noninverting input voltage (+) to the comparator 406, resistances 410, 411 which serve to voltage divide the reference power supply voltage V thereby to generate an inverting input voltage (−) to the comparator 407, resistances 414, 415 which serve to voltage divide the voltage of the output sensing terminal a thereby to generate a noninverting input voltage (+) to the comparator 407, and, a resistance 416 and a Zener diode 417 which generate the reference power supply voltage V from the voltage of the starting terminal b.

Next, reference will be made to the field current control operation of the electric generator ACG by means of the conventional power generation control device 400 shown in FIG. 7.

First, when the key switch 6 is turned on (closed) to make the starting terminal b of the power generation control device 400 and the batteries 5 conductive with each other, an electric current is supplied from the battery 5 to the inside of the power generation control device 400 through the key switch 6 and the starting terminal b.

As a result of this, the electric current is supplied to the Zener diode 417 by way of the resistance 416 inside the power generation control device 400, so that the reference power supply voltage V of a constant or fixed voltage used as a power supply for the entire circuit inside the power generation control device 400 is generated, thus resulting in a state in which an control operation by means of the power generation control device 400 can be made.

When the power generation control device 400 is placed in the state in which the control operation thereof can be made, the comparator 406 makes a comparison between an input voltage (+) which is obtained by voltage dividing the battery voltage inputted from the external sensing terminal c by the resistances 412, 413, and a reference voltage (−) which is obtained by voltage dividing the voltage of the reference power supply voltage V by the resistances 408, 409.

The comparator 406 outputs a Lo (low) electric potential, in cases where the input voltage (+) is lower than the reference voltage (−), whereas it outputs a Hi (high) electric potential, in cases where the input voltage (+) is equal to or higher than the reference voltage (−).

In addition, the power generation control device 400 is provided with the comparator 407 as a backup when abnormality (a break or disconnection, etc.) occurs in the external sensing terminal c, and the comparator 407 makes a comparison between the input voltage (+) which is obtained by voltage dividing the voltage of the output end A inputted from the output sensing terminal a by the resistances 414, 415, and the reference voltage (−) which is obtained by voltage dividing the voltage of the reference power supply voltage V by the resistance 410 and the resistance 411.

The comparator 407 outputs a Lo electric potential in cases where the input voltage (+) is lower than the reference voltage (−), and outputs a Hi electric potential in cases where the input voltage (+) is equal to or higher than the reference voltage (−).

As described above, in the conventional power generation control device 400, the output potential of the comparator 406 with respect to the external sensing terminal c and the output potential of the comparator 407 with respect to the output sensing terminal a are used for the gate terminal of the one switching transistor 401.

At this time, it is constructed such that a target voltage value of the power generation voltage based on the reference voltage (−) of the comparator 407 is set to a value higher than a target voltage value based on the reference voltage (−) of the comparator 406, and that the output potentials of the comparators 406, 407 can be controlled through the NOR circuit 405 in a suitable manner.

In other words, only in cases where the output potentials of both of the comparators 406, 407 are low (Lo electric potential), the NOR circuit 405 outputs a Hi electric potential thereby to turn on the switching transistor 401, so that a field current is supplied to the field coil 2.

On the other hand, when either one of the output potentials of the comparators 406, 407 becomes high (Hi electric potential), the NOR circuit 405 outputs a Lo electric potential thereby to turn off the switching transistor 401, so that the field current to the field coil 2 is interrupted.

However, a target voltage value of the comparator 407 is higher than a target voltage value of the comparator 406, and hence, in cases where there is no abnormality in the external sensing terminal c, the output potential of the comparator 407 always becomes low (Lo electric potential). Accordingly, the control operation to the switching transistor 401 is not affected, and the control operation of the switching transistor 401 becomes an operation which depends on the output of the comparator 406.

In cases where the battery voltage is in a low state immediately after starting of the internal combustion engine, the input voltage (+) of the comparator 406 becomes lower than the reference voltage (−), so that the comparator 406 outputs a Lo electric potential.

When the comparator 406 outputs a Lo electric potential, the output potential of the NOR circuit 405 becomes high (Hi electric potential), so that a voltage is applied to the gate terminal of the switching transistor 401, thereby placing the source and the drain of the switching transistor 401 in a conductive state.

As a result of this, the field current is supplied from the battery 5 to the field coil 2 by the way of the output sensing terminal a, the switching transistor 401, and the terminal f, so that the magneto motive force of the field coil 2 is thereby increased. In addition, at this time, a high (Hi) electric potential is outputted from the external output terminal d.

In this state, as the rotational speed of the electric generator ACG increases in accordance with the starting of the internal combustion engine, the power generation voltage generated in the stator coil 1 also increases.

The alternating current voltage generated in the stator coil 1 is rectified into a direct current voltage by means of the three phase full wave rectifier 3, so that an electric current is supplied to the battery 5 and the electric load 7.

In accordance with the increase in the power generation voltage of the electric generator ACG, the battery voltage also increases, and so, the input voltage (+) of the comparator 406 increases.

After that, when the input voltage (+) of the comparator 406 becomes higher than the reference voltage (−) so that the comparator 406 outputs a high (Hi) electric potential, the output of the NOR circuit 405 becomes a low (Lo) electric potential, so that the voltage is no longer applied to the gate terminal of the switching transistor 401.

According to this, the conduction between the source and the drain of the switching transistor 401 is put in an interrupted or cut off state, so that the supply of the field current to the field coil 2 is interrupted, as a result of which the magnetomotive force of the field coil 2 reduces and the power generation voltage of the electric generator ACG also decreases. In addition, the electric potential of the external output terminal d at this time becomes a low (Lo) electric potential.

In this manner, the power generation control device 400 carries out field current control on the field coil 2, in such a manner that an electrical energization operation and a cutoff operation for the field current is repeated, whereby the power generation voltage of the electric generator ACG is regulated to the target voltage value, and at the same time, a signal synchronized with the field current control signal from the external output terminal d is outputted to the outside.

In cases where an abnormality such as a break or disconnection of the external sensing terminal c, etc., has occurred in the power generation control device 400 and the field current control by the comparator 406 becomes impossible, the comparator 407 carries out field current control on the output voltage of the electric generator ACG inputted from the output sensing terminal a, similarly to the above-mentioned operation of the comparator 406, thus regulating the power generation voltage of the electric generator ACG to the target voltage value.

Next, reference will be made to a case in which two electric generators each having the power generation control device 400 in FIG. 7 installed thereon are used and operated in parallel to each other at the same time.

FIG. 8 is a block construction view diagrammatically showing a connection state of the conventional electric generators (including the power generation control devices), wherein the connection relation in the case of carrying out the parallel operation of the two electric generators (a main electric generator ACG1 and a subordinate electric generator ACG2) at the same time is shown by only individual terminals.

In FIG. 8, there are shown, in a simplified manner, individual output ends A1, A2 of the main electric generator ACG1 and the subordinate electric generator ACG2, the starting terminal b1, b2, the external sensing terminal c1, c2 and the external output terminal d1, d2 of the individual power generation control devices 400 (refer to FIG. 7) for the main electric generator ACG1 and the subordinate electric generator ACG2.

The external sensing terminals c1, c2 of the main electric generator ACG1 and the subordinate electric generator ACG2 are connected to the battery 5.

In addition, the individual power generation control devices 400 of the main electric generator ACG1 and the subordinate electric generator ACG2 are operatively connected to the key switch 6, so that they are put in a state in which their control operations become possible, by being supplied with electric currents from the starting terminal b1, b2.

As stated above, the individual power generation control devices 400 of the main electric generator ACG1 and the subordinate electric generator ACG2 carry out field current control to the field coil 2. The field current control to the field coils 2 is carried out by making a comparison between the input voltage from each of the external sensing terminals c1, c2 or each of the output sensing terminals a1, a2, and the target voltage value of the power generation voltage based on the reference voltage of each of the comparators 406 (refer to FIG. 7).

At this time, a variation at the time of production exists in the target voltage value of each of the power generation control devices 400 of the main electric generator ACG1 and the subordinate electric generator ACG2, and hence, one of the electric generators having one of the power generation control devices with a lower target voltage value first begins to interrupt the field current to the field coil 2, and the other electric generator having the other power generation control device with a higher target voltage value has a longer period of time to supply the field current to the field coil 2.

SUMMARY OF THE INVENTION

Problems to be Solved by the Invention

The conventional power generation control devices have the following problem. That is, in cases where the parallel operations of the two electric generators are carried out at the same time, the one electric generator having the one power generation control devices with a lower target voltage value first begins to interrupt the field current to the field coil, resulting from the variation at the time of production, and the other electric generator having the other power generation control device with a higher target voltage value has a longer period of time to supply the field current to the field coil. As a result, the load to the other electric generator and the other power generation control device with a higher target voltage value will become large, so that a difference in life time will occur.

The present invention has been made in order to solve the problems as referred to above, and has for its object to obtain to obtain a power generation control apparatus in which when a plurality of electric generators are caused to operate in parallel with one another at the same time, field current control operations of individual power generation control devices are caused to synchronize with one another thereby to equalize load balance therebetween.

Means for Solving the Problems

A power generation control apparatus according to this invention is one for obtaining stable uniform operations of a plurality of electric generators at the time when the plurality of electric generators including a main electric generator and a subordinate electric generator which are mounted on one internal combustion engine are driven to operate at the same time by means of the internal combustion engine, wherein the power generation control apparatus is composed of a first power generation control device connected to the main electric generator, and a second power generation control device connected to the subordinate electric generator. The first and the second power generation control devices are each provided with an external sensing terminal that detects an external voltage of each electric generator to which itself belongs, an output sensing terminal that detects a power generation voltage generated by each electric generator itself, and an external output terminal that outputs a signal synchronized with a field current control signal for each field coil of each electric generator, wherein the power generation voltage of each electric generator is regulated to a target voltage value by carrying out field current control in which a field current is supplied to each field coil in an intermittent manner, and when these electric generators are caused to drive at the same time, the external output terminal of the first power generation control device and the external sensing terminal of the second power generation control device are connected to each other.

Effect of the Invention

According to the present invention, by connecting the external output terminal of the main electric generator and the external sensing terminal of the subordinate electric generator to each other, the subordinate electric generator carries out power generation control in synchronization with the field current control of the main electric generator, so that the load balance of the individual electric generators and the individual power generation control devices can be equalized.

MODES FOR CARRYING OUT THE INVENTION (First Embodiment)

Figure 1:
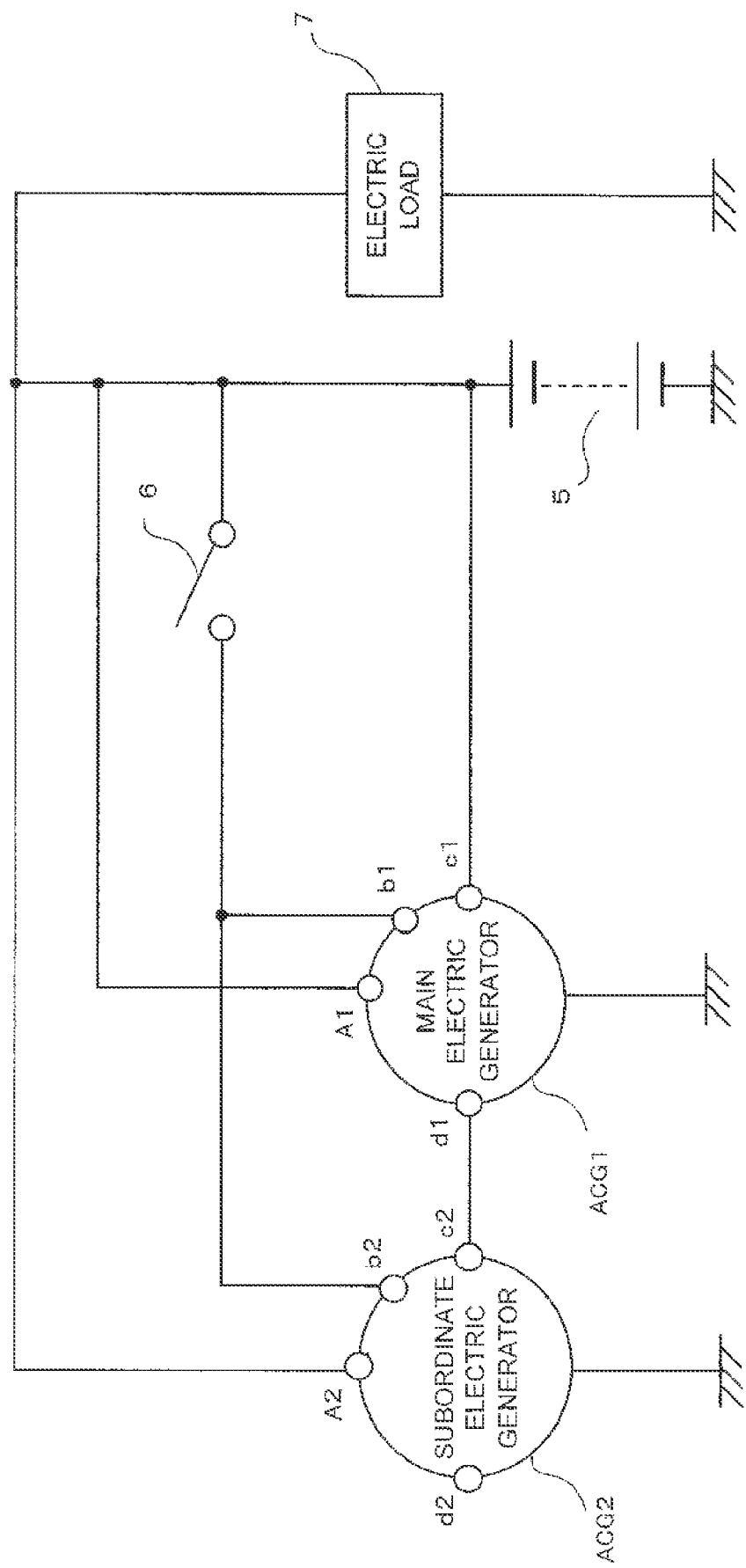
[FIG. 1] is a block construction view diagrammatically showing a connection state of electric generators and a power generation control device according to a first embodiment of the present invention. (First Embodiment)

FIG. 1 is a block construction view diagrammatically showing a connection state of electric generators and a power generation control device according to a first embodiment of the present invention.

In FIG. 1, a main electric generator ACG1 and a subordinate electric generator ACG2 are shown as two electric generators which are caused to operate in parallel with each other, wherein it is assumed that the electric generators ACG1, ACG2 include a first and a second power generation control device (to be described later together with FIG. 2), respectively, which are individually connected thereto.

The main electric generator ACG1 and the subordinate electric generator ACG2 have their output ends A1, A2, respectively, connected to a battery 5 and an electric load 7.

Here, note that the individual power generation control devices for the individual electric generators ACG1, ACG2 have output sensing terminals a1, a2 (not shown) connected to the individual output ends A1, A2, respectively.

The main electric generator ACG1 and the subordinate electric generator ACG2 have starting terminals b1, b2 for the individual power generation control devices connected to the battery 5 through a key switch 6.

The main electric generator ACG1 has an external sensing terminal c1 connected to the battery 5, and the subordinate electric generator ACG2 has an external sensing terminal c2 connected to an external output terminal d1 of the main electric generator ACG1.

The individual power generation control devices for the individual electric generators ACG1, ACG2 are operatively connected to the key switch 6, so that they are put in a state in which their control operations are possible, by being supplied with electric current from the battery 5 through the starting terminals b1, b2.

Figure 2:
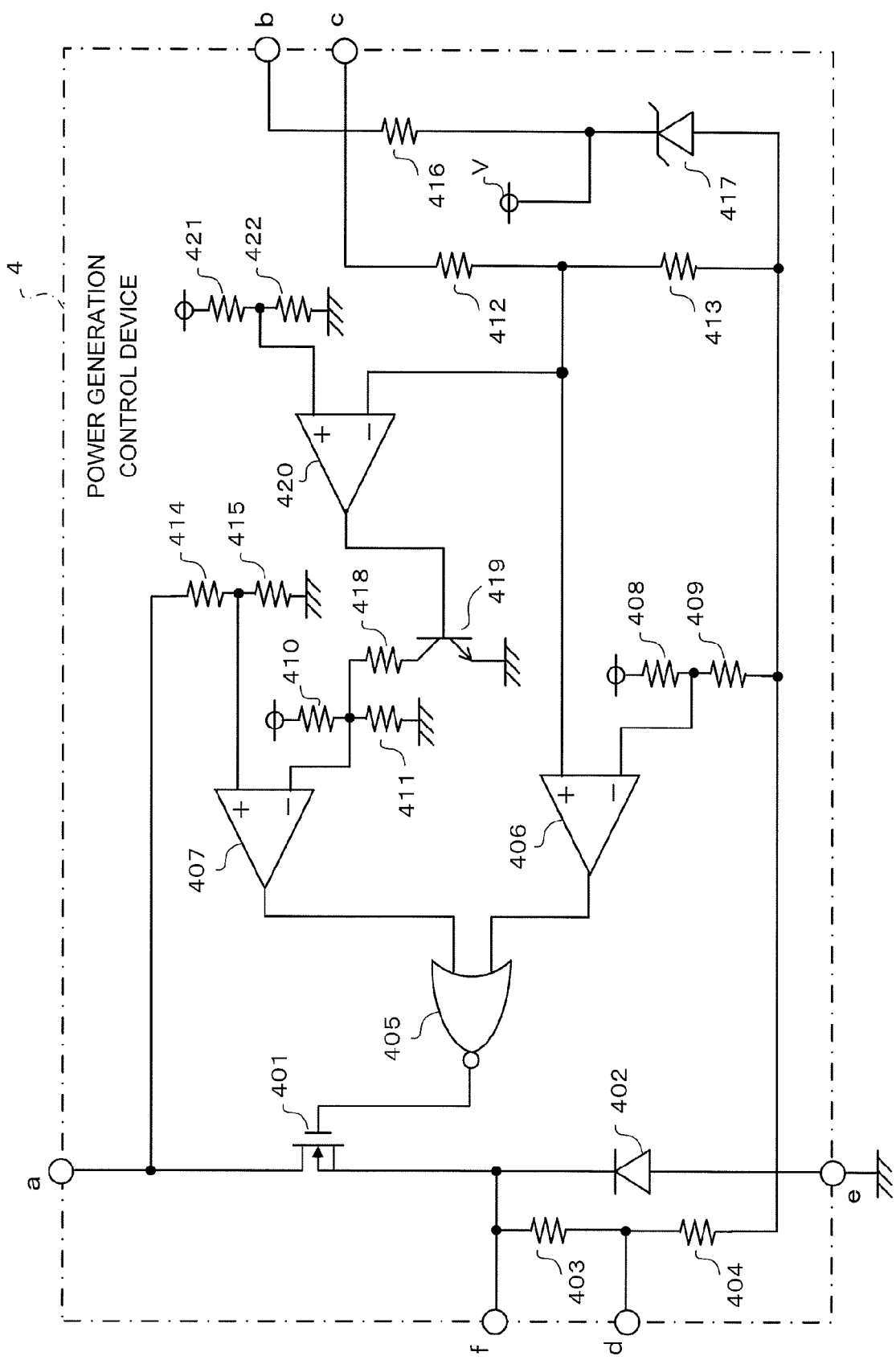
[FIG. 2] is a block diagram showing the power generation control device according to the first embodiment of the present invention. (First Embodiment)

FIG. 2 is a block diagram showing a power generation control device according to the first embodiment of the present invention.

Although in FIG. 2, the main electric generator ACG1 (or the subordinate electric generator ACG2), the battery 5, the key switch 6, and the electric load 7 are omitted, the first and the second power generation control devices 4 eavh having the circuit configuration of FIG. 2 are individually connected to the main electric generator ACG1 and the subordinate electric generator ACG2, respectively.

In addition, the individual power generation control devices 4 are also connected to the battery 5, the key switch 6, and the electric load 7, similarly as stated above.

The individual power generation control devices 4 are each provided with an output sensing terminal a, a terminal b for starting (hereinafter referred to as a starting terminal), an external sensing terminal c, an external output terminal d, a terminal e for ground, and a terminal f for field current control.

Figure 7:
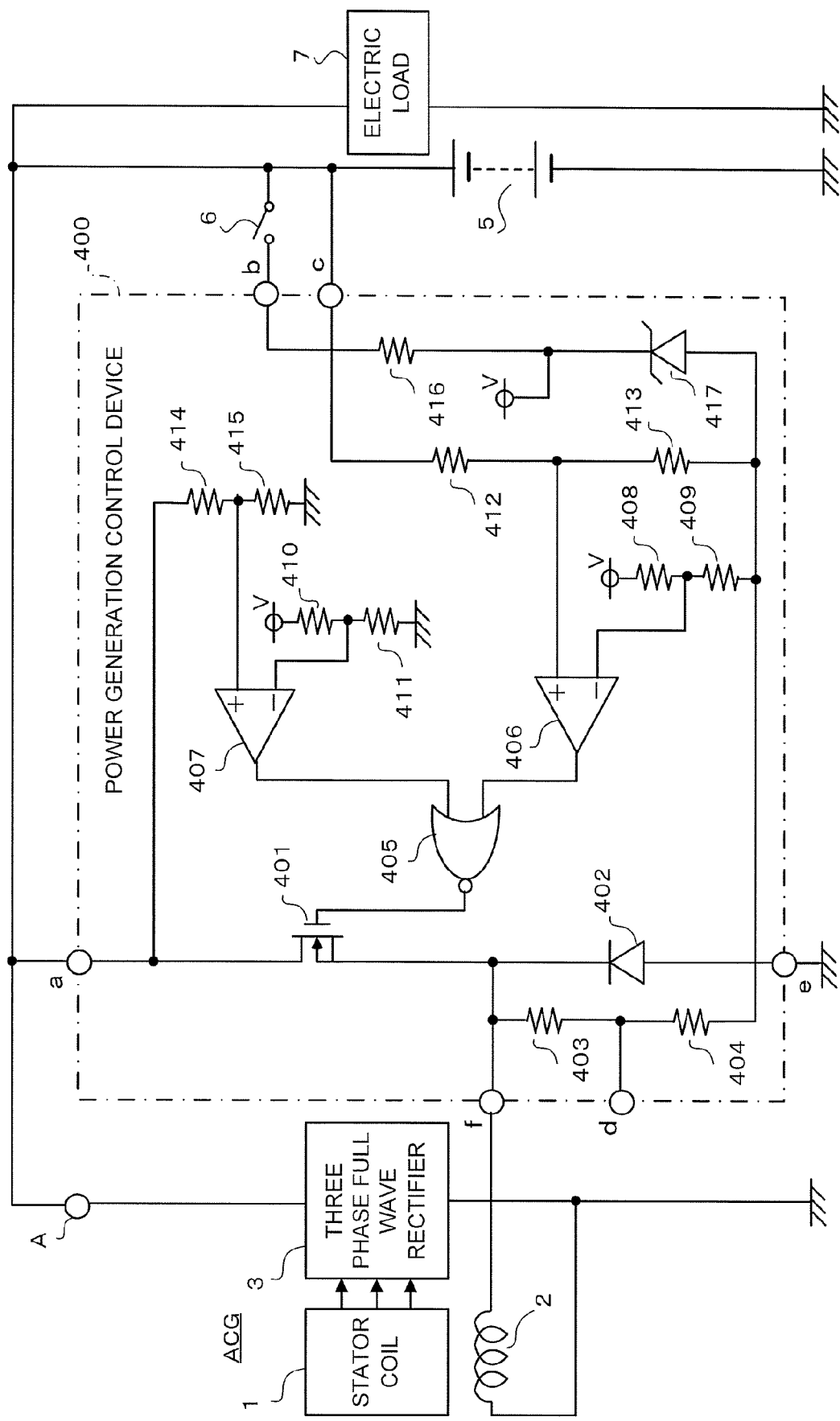
FIG. 7 is a block diagram showing a conventional general power generation control apparatus together with an electric generator.
Figure 8:
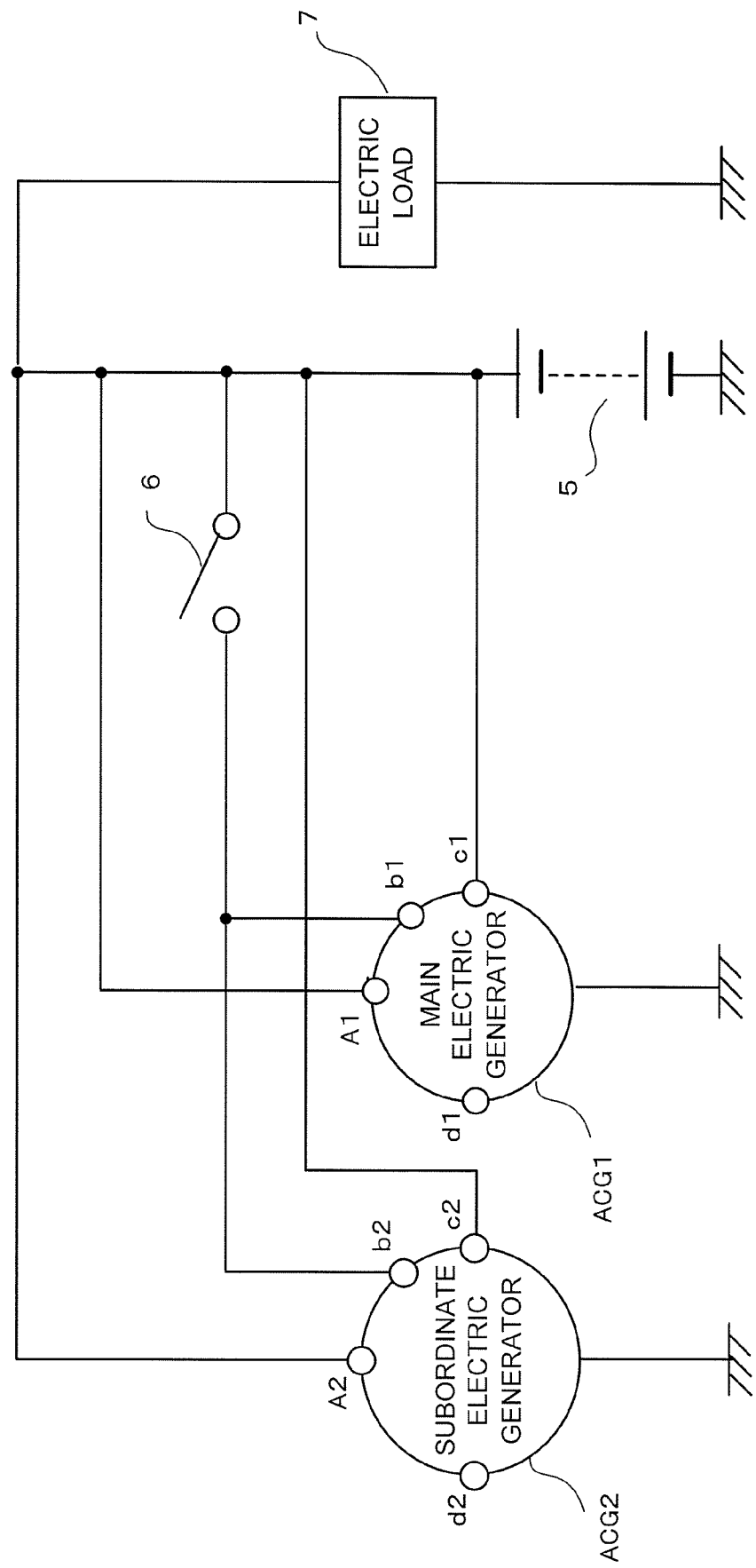
[FIG. 8] is a block construction view diagrammatically showing a conventional connection state of electric generators and a power generation control device.

In addition, the power generation control devices 4 are each provided, in addition to the circuit configuration of the conventional power generation control device 400 (FIG. 7), with a resistance 418 that is connected to a connection point of resistances 410, 411 at which a reference voltage (−) of a comparator 407 is generated, a transistor 419 of common emitter that has a collector terminal connected to the resistance 418, a comparator 420 that detects an input state of the external sensing terminal c (c2) and performs on and off operation of the transistor 419, and resistances 421, 422 that serve to voltage divide a reference power supply voltage V thereby to generate a noninverting input voltage (+) to the comparator 420.

The comparator 420 has an inverting input terminal (−) connected to the connection point of the resistances 412, 413 which serve to voltage divide the voltage of the external sensing terminal c.

The resistance 418, the transistor 419 and the comparator 420 have a function to change over the reference voltage (−) of the comparator 407 according to the input state of the external sensing terminal c.

The comparator 420 divides a voltage inputted from the external sensing terminal c by means of the resistances 412, 413, takes it in as an inverting input voltage (−), and makes a comparison between the inverting input voltage and the reference voltage (+) which is obtained by voltage dividing the reference power supply voltage V by the resistances 421, 422.

The reference voltage (+) of the comparator 420 is set to be a value which is lower than a reference voltage (−) of the comparator 406.

The comparator 420 outputs a Hi electric potential in cases where the inverting input voltage (−) is lower than the reference voltage (+), and outputs a Lo electric potential in cases where the inverting input voltage (−) is equal to or higher than the reference voltage (+).

In cases where the comparator 420 outputs a Hi electric potential, the transistor 419 is turned on, and hence, the reference voltage (−) of the comparator 407 is changed over to a voltage value which is obtained by voltage dividing the reference power supply voltage V by a combined resistance (the resistances 410, 411, 418) (i.e., a voltage value lower than that in the case of voltage dividing the reference power supply voltage V by only the resistances 410, 411).

Accordingly, in cases where the comparator 420 outputs a Hi electric potential (i.e., the inverting input voltage (−) is lower than the reference voltage (+)), the target voltage value of the power generation voltage based on the reference voltage (−) of the comparator 407 is changed over to a value lower than the target voltage value of the comparator 406.

Next, reference will be made to a field current control operation at the time of causing the main electric generator ACG1 and the subordinate electric generator ACG2, which are connected to each other, as shown in FIG. 1, to operate in parallel with each other at the same time, with the first and the second power generation control devices 4, which are each composed of the circuit configuration of FIG. 2, being mounted on the main electric generator ACG1 and the subordinate electric generator ACG2, respectively.

First, a battery voltage is applied to the external sensing terminal c1 of the main electric generator ACG1.

At this time, in the first power generation control device 4 (refer to FIG. 2) connected to the main electric generator ACG1, the input voltage (−) becomes higher than the reference voltage (+), and the comparator 420 outputs a Lo electric potential, and so, the transistor 419 remains still off.

Accordingly, the target voltage value of the power generation voltage of the comparator 407 in the main electric generator ACG1 is still higher than the target voltage value of the comparator 406, and the output potential of the comparator 407 is fixed to the Lo electric potential.

As a result, the first power generation control device 4 carries out field current control depending on the output potential of the comparator 406.

On the other hand, in the subordinate electric generator ACG2, a field current control signal from the external output terminal d1 of the first power generation control device 4 (ACG1) is inputted to the external sensing terminal c2 of the second power generation control device 4 (refer to FIG. 2).

At this time, in cases where the switching transistor 401 of the first power generation control device 4 (ACG1) is turned on to supply a field current to the field coil 2 (refer to FIG. 7), the external output terminal d1 of the main electric generator ACG1 becomes a Hi electric potential, and hence, a Hi electric potential is inputted to the external sensing terminal c2 of the subordinate electric generator ACG2.

In addition, the comparator 420 of the second power generation control device 4 (ACG2) outputs a Lo electric potential, because the input voltage (−) becomes higher than the reference voltage (+).

As a result of this, the target voltage value of the power generation voltage by the comparator 407 of the second power generation control device 4 (ACG2) remains to be higher than the target voltage value of the comparator 406.

Further in the subordinate electric generator ACG2, the Hi electric potential of the field current control signal, which is inputted to the external sensing terminal c2 of the second power generation control device 4, is a voltage value which is obtained by voltage dividing an electric potential of the terminal f of the first power generation control device 4 (ACG1) by the resistances 403, 404. As a result, the input voltage (+) of the comparator 406 is always lower than the reference voltage (−), so it outputs a Lo electric potential.

As a result, the second power generation control device 4 (ACG2) carries out the control operation depending on the output of the comparator 407 by means of the output sensing terminal a2.

Accordingly, the first power generation control device 4 (ACG1) carries out the field current control with respect to the external sensing terminal c1 by means of the comparator 406, whereas, on the other hand, the second power generation control device 4 (ACG2) carries out the field current control with respect to the output sensing terminal a2 by means of the comparator 407.

Here, because in the second power generation control device 4 (ACG2), the target voltage value of the power generation voltage by the comparator 407 is higher than the target voltage value of the power generation voltage by the comparator 406, the noninverting input voltage (+) to the comparator 407 is lower than the reference voltage (−), and the comparator 407 outputs a Lo electric potential, so that the field current to the field coil 2 is supplied.

Moreover, in cases where the first power generation control device 4 (ACG1) turns off the switching transistor 401 thereby to interrupt the field current to the field coil 2, the external output terminal d1 of the first power generation control device 4 (ACG1) becomes a Lo electric potential, and hence, a Lo electric potential is inputted to the external sensing terminal c2 of the second power generation control device 4 (ACG2), too.

Further, in the subordinate electric generator ACG2, the input voltage (−) becomes lower than the reference voltage (+), and hence, the comparator 420 of the second power generation control device 4 outputs a Hi electric potential, as a consequence of which the target voltage value of the power generation voltage in the comparator 407 is set to a value which is lower than the target voltage value of the power generation voltage of the comparator 406.

As a result, in the comparator 407 of the second power generation control device 4 (ACG2), the input voltage (+) becomes higher than the reference voltage (−), so that a Hi electric potential is outputted, thereby interrupting the field current to the field coil 2.

As described above, in order to drive the plurality of electric generators including the main electric generator ACG1 and the subordinate electric generator ACG2, which are mounted on one internal combustion engine, at the same time by means of the internal combustion engine, the power generation control apparatus according to the first embodiment of the present invention (FIG. 1 and FIG. 2) is provided with the first power generation control device 4 connected to the main electric generator ACG1, and the second power generation control device 4 connected to the subordinate electric generator ACG2.

The first and the second power generation control devices 4 are each provided with the external sensing terminal c (c1, c2) that detects an external voltage of each electric generator to which itself belongs, the output sensing terminal a (a1, a2) that detects a power generation voltage generated by each electric generator itself, and the external output terminal d (d1, d2) that outputs a signal synchronized with a field current control signal for each field coil 2 of each electric generator.

Each of the individual power generation control devices 4 of the plurality of electric generators regulates the power generation voltage of each electric generator to a target voltage value by carrying out field current control in which the field current is supplied to each field coil 2 in an intermitten manner.

In addition, when the plurality of electric generators are caused to drive at the same time, the external output terminal d1 of the first power generation control device 4 and the external sensing terminal c2 of the second power generation control device 4 are connected to each other.

The second power generation control device 4 detects the field current control signal of the main electric generator ACG1 by means of the external sensing terminal c2, and carries out power generation control with respect to the subordinate electric generator ACG2 in synchronization with the field current control of the main electric generator ACG1.

Further, the second power generation control device 4 is provided with the comparator 420 that serves to compare a detected voltage of the external sensing terminal c2 with a reference voltage, and the resistances 410, 411, 418 (resistance circuit) that serve to change over and set the target voltage value in response to the output potential of the comparator 420, wherein in cases where it is detected that the field current control signal of the main electric generator ACG1 is in an interrupted state, the target voltage value of the power generation voltage with respect to the output sensing terminal a2 is changed over to a low voltage.

That is, in cases where the field current control signal of the main electric generator ACG1 is an energization signal, the field current is also supplied to the field coil 2 in the subordinate electric generator ACG2.

On the other hand, in cases where the field current control signal of the main electric generator ACG1 is an interruption signal, the field current to the field coil 2 is interrupted in the subordinate electric generator ACG2, too, As a result of this, the field current control of the main electric generator ACG1 becomes in synchronization with the field current control of the subordinate electric generator ACG2, and hence, the load balance of the main electric generator ACG1 (and the power generation control device 4) and the subordinate electric generator ACG2 (and the power generation control device 4) can be equalized, thus making it possible to eliminate the difference in life time between the individual electric generators and between the individual power generation control devices.

(Second Embodiment)

Figure 3:
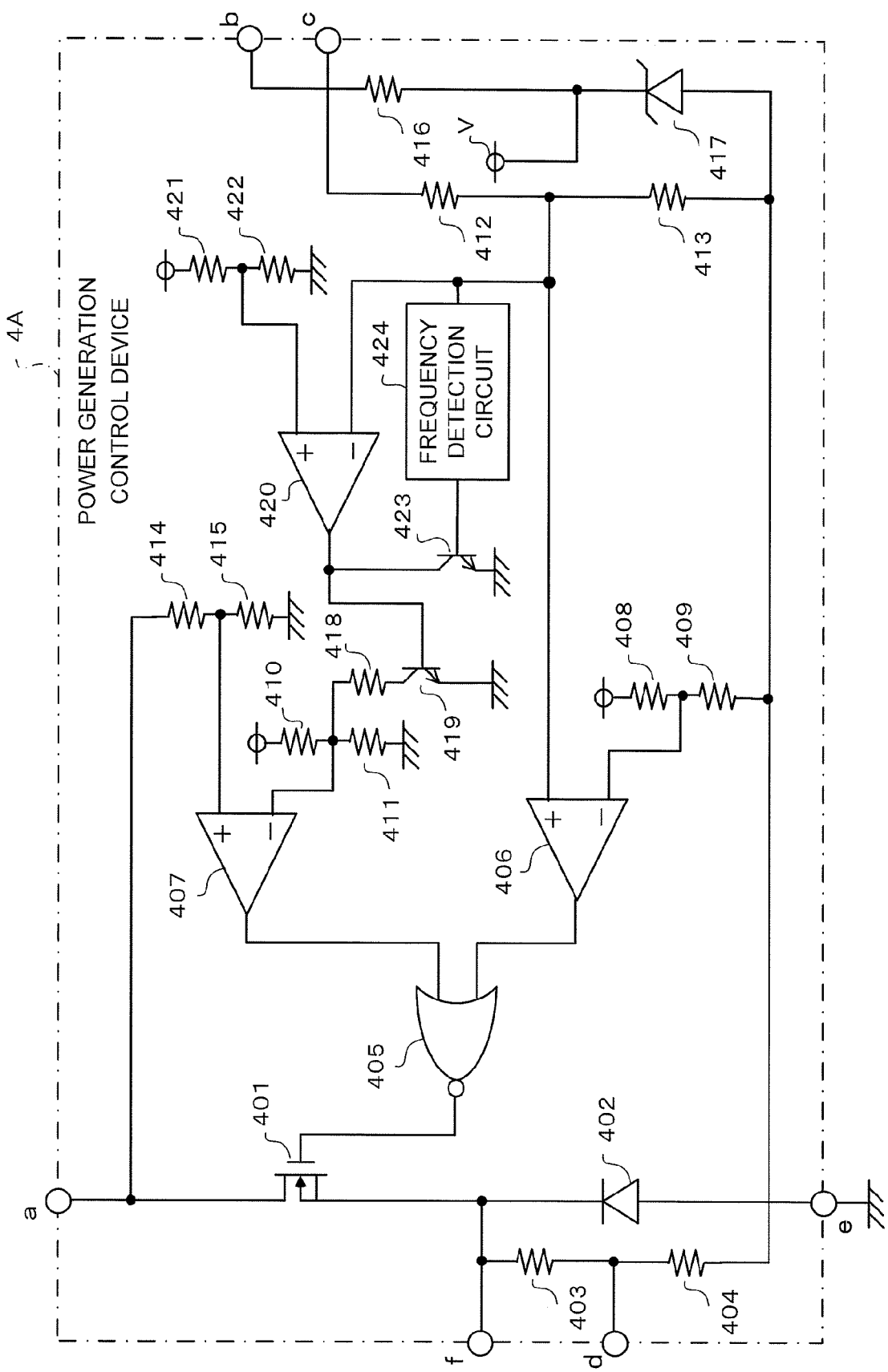
[FIG. 3] is a block diagram showing a power generation control device according to a second embodiment of the present invention. (Second Embodiment)

Although in the above-mentioned first embodiment (FIG. 2), the resistance 418, the transistor 419 and the comparator 420 are arranged in the second power generation control device 4, better control can be made by the provision of a transistor 423 and a frequency detection circuit 424, as shown in FIG. 3.

FIG. 3 is a block diagram showing a power generation control device according to a second embodiment of the present invention, wherein those which are similar to the aforementioned ones (refer to FIG. 2) are denoted by the same reference numerals and characters as those in the aforementioned ones, while omitting a detailed explanation thereof.

In FIG. 3, a power generation control device 4A is provided with the transistor 423 and the frequency detection circuit 424, in addition to the above-mentioned configuration (FIG. 2).

The frequency detection circuit 424 detects the frequency of a signal inputted to the external sensing terminal c (c2).

The transistor 423 is made conductive (turned on) in response to an output potential of the frequency detection circuit 424, thereby disabling or nullifying the output potential of the comparator 420.

In the following, reference will be made to the operation of the power generation control device according to the second embodiment of the present invention, in the case of controlling a plurality of electric generators at the same time, while referring to FIG. 1, FIG. 3 and FIG. 4.

Figure 4:
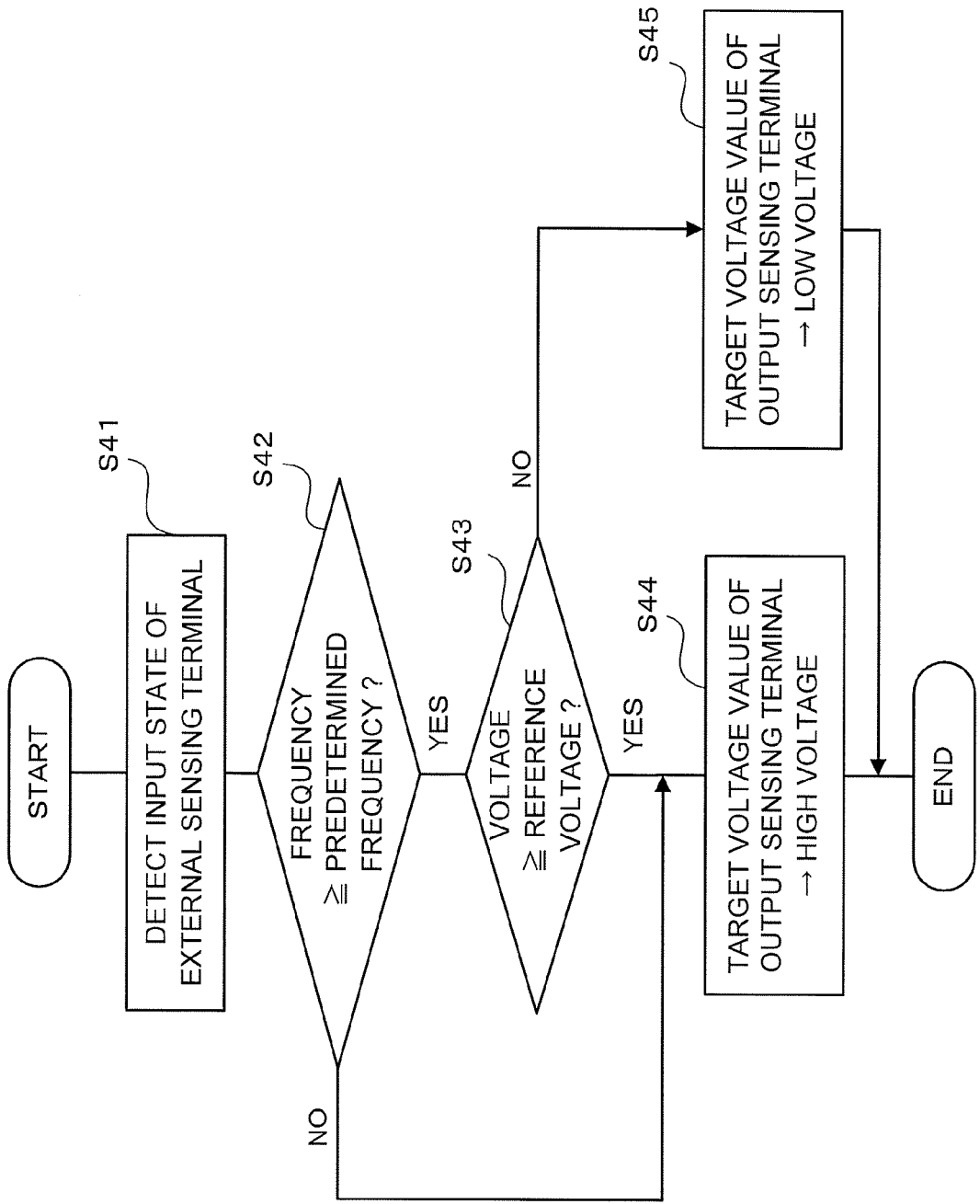
[FIG. 4] is a flow chart showing an operation according to the second embodiment of the present invention. (Second Embodiment)

FIG. 4 is a flow chart showing a change-over operation or routine according to the second embodiment of the present invention.

In FIG. 4, first, the comparator 420 and the frequency detection circuit 424 detect an input state (voltage, frequency) from an external output terminal d1 at the side of a main electric generator ACG1 to an external sensing terminal c (c2) (step S41).

Subsequently, the frequency detection circuit 424 makes a comparison between the frequency inputted to the external sensing terminal c (c2) and a predetermined frequency, and determines whether the relation of the frequency≥the predetermined frequency is satisfied (step S42).

When a determination is made in step S42 that the frequency<the predetermined frequency (that is, NO), the frequency detection circuit 424 makes the transistor 423 conductive (on), and nullifies the output potential of the comparator 420, so that the reference voltage (−) of the comparator 407 is fixed to the state in which it is higher than the target voltage value of the power generation voltage based on the target voltage of the comparator 406.

That is, the target voltage value of the output sensing terminal a (a2) is set to a high voltage (step S44).

On the other hand, in step S42, when a determination is made that the frequency≥the predetermined frequency (that is, YES), subsequently, the comparator 420 makes a comparison between a voltage inputted to the external sensing terminal c (c2) and a reference voltage, and determines whether the relation of the voltage≥the reference voltage is satisfied (step S43).

In step S43, when a determination is made that the voltage the reference voltage (that is, YES), the control flow shifts to step S44.

On the other hand, when a determination is made in step S43 that the voltage<the reference voltage (that is, NO), the comparator 420 makes the transistor 419 conductive (on) thereby to change over the reference voltage of the comparator 407 to a low voltage, so that the target voltage value of the output sensing terminal a (a2) is set to a low voltage (step S45).

With the above, the change-over control routine (FIG. 4) of the target voltage value is ended.

When the individual electric generators ACG1, ACG2 are driven to operate in parallel with each other at the same time, while connecting individual power generation control devices 4A, each composed of the circuit configuration of FIG. 3, being connected with one another in a manner as shown in FIG. 1, a field current control signal from the external output terminal d1 of the first power generation control device 4A (ACG1) is inputted to the external sensing terminal c2 of the second power generation control device 4A (ACG2).

At this time, the field current control signal inputted to the external sensing terminal c2 is an intermittent on/off signal of the switching transistor 401, and hence becomes a rectangular wave signal with a frequency component.

Accordingly, if the individual power generation control devices 4A are in normal state, a frequency signal with more than a predetermined frequency will be inputted to the frequency detection circuit 424 of the second power generation control device 4A. As a result, the transistor 423 will be put into an off state, so that the output potential of the comparator 420 will be validated.

As a result, it becomes possible to change over the reference voltage (−) of the comparator 406 in response to the input state (voltage) of the external sensing terminal c (c2), and the operation of the subordinate electric generator ACG2 in synchronization with the above-mentioned field current control is not affected.

However, in cases where abnormality or trouble such as breakage, disconnection or ground fault, has occurred in either of the individual power generation control devices 4A and the input state of the external sensing terminal c (c2) is fixed at a Lo electric potential, if there is no provision of the frequency detection circuit 424 (FIG. 3, FIG. 4), the target voltage value of the comparator 407 of the second power generation control device 4A (ACG2) will be fixed to a value which is lower than the target voltage value of the comparator 406.

As a result, the state in which the power generation voltage of the second power generation control device 4A (ACG2) is low continues, so that it becomes impossible to supply an appropriate electric current to the battery 5 and the electric load 7 (refer to FIG. 1).

Accordingly, by adding the frequency detection circuit 424 inside the second power generation control device 4A, the target voltage value of the comparator 407 can be fixed to a state in which it is higher than the target voltage value of the comparator 406.

Accordingly, the field current control by means of the output sensing terminal a (a2) becomes possible, thus making it possible to obtain a stable control operation.

As described above, according to the second embodiment (FIG. 3, FIG. 4) of the present invention, the second power generation control device 4A is provided with the frequency detection circuit 424 that serves to detect the frequency of the field current control signal inputted to the output sensing terminal a (a2).

In cases where the frequency of the detected field current control signal is lower than the predetermined frequency, the frequency detection circuit 424 disables or nullifies the output potential of the comparator 420, thereby interrupting the power generation control with respect to the subordinate electric generator ACG2 for which the field current control is synchronized with that of the main electric generator ACG1.

According to this, similar to the above-mentioned first embodiment, it becomes possible to operate the main electric generator ACG1 and the subordinate electric generator ACG2 with the synchronized field current control thereof, so that load balance can be made uniform.

Further, even in cases where a signal line between the main electric generator ACG1 and the subordinate electric generator ACG2 becomes abnormal, a stable control operation can be made possible.

(Third Embodiment)

Figure 5:
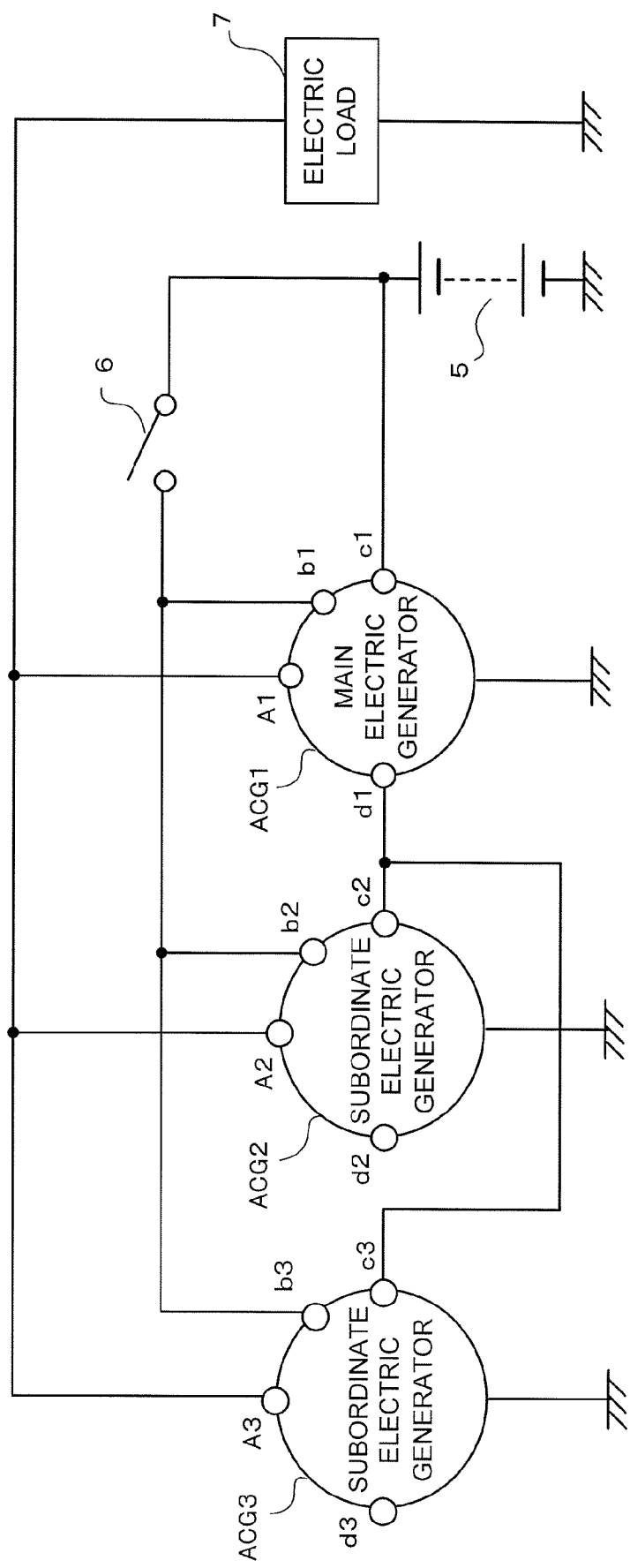
[FIG. 5] is a block construction view diagrammatically showing a connection state of electric generators and a power generation control device according to a third embodiment of the present invention. (Third Embodiment)

Although in the above-mentioned first embodiment and the second embodiment (FIG. 1), there has been shown the case where the two electric generators (ACG1, ACG2) are operated in parallel with each other at the same time, the present invention is not limited to this, and it goes without saying that, for example, even in cases where three or more (n) electric generators (ACG1-ACG3) are used, as shown in FIG. 5, it is possible to carry out the parallel operation of the individual electric generators with synchronized field current control thereof.

In FIG. 5, another subordinate electric generator ACG3 is additionally arranged, wherein a field current control signal from the external output terminal d1 of the first power generation control device (ACG1) is inputted to an external sensing terminal c3 of a third power generation control device (ACG3). In addition, an output sensing terminal a3 (not shown) is connected to an output end A3 of the subordinate electric generator ACG3.

In the connection state of the individual power generation control devices (ACG1-ACG3) shown in FIG. 5, one main electric generator ACG1 is set, and a field current control signal is inputted from the external output terminal d1 of the first power generation control device (ACG1) to the external sensing terminals c2, c3 of all the other subordinate electric generators ACG2, ACG3.

(Fourth Embodiment)

Figure 6:
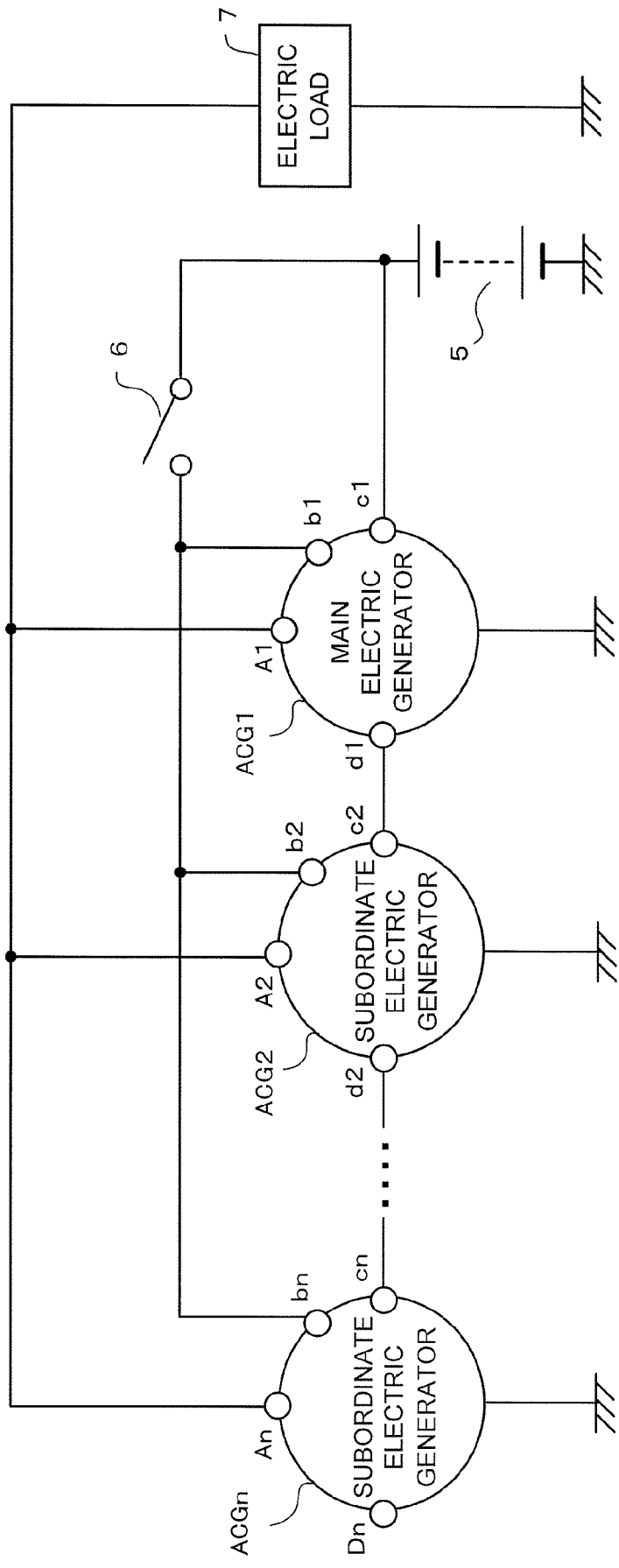
[FIG. 6] is a block construction view diagrammatically showing a connection state of electric generators and a power generation control device according to a fourth embodiment of the present invention. (Fourth Embodiment)

In addition, other than the connection state of FIG. 5, it is also possible to carry out parallel operation of an arbitrary number of (n) electric generators ACG1 through ACGn at the same time, as shown in FIG. 6.

In the connection state of the individual power generation control devices (ACG1-ACGn) shown in FIG. 6, one main electric generator ACG1 is set, and field current control signals from external output terminals dn-1 of preceding power generation control devices (ACGn-1) are inputted to external sensing terminals c2-cn of the other individual power generation control devices (subordinate electric generators ACG2-ACGn), respectively. In addition, an output sensing terminal an (not shown) is connected to an output end An of the subordinate electric generator ACGn.

In any of the connection states of FIG. 5 and FIG. 6, too, the parallel operation can be carried out while synchronizing field current control operations with each other, similarly as stated above.

It addition, it goes without saying that according to the combination of the connections of FIG. 5 and FIG. 6, the synchronized parallel operation can also be carried out by connecting an external sensing terminal (c) to an external output terminal (d) of any of the electric generators.

Although in the above-mentioned first through fourth embodiments, no particular reference has been made, it goes without saying that the power generation control devices of the individual electric generators are of the same configuration or arrangement, and that other than in cases where a plurality of electric generators are controlled at the same time, in cases where one electric generator is used alone or in a single unit, too, the field current control of the electric generator can be made.

For example, in cases where electric generators each having the power generation control device of the first or second embodiment (FIG. 2, FIG. 3) of the present invention mounted thereon are independently used alone, without being mutually connected to one another, too, the field current control of each electric generator can be carried out by detecting a battery voltage by means of an external sensing terminal c, similarly as stated above.

Moreover, in cases where an external sensing terminal c is disconnected at the time when electric generators (power generation control devices) are independently used alone, the field current control of each electric generator can be carried out by detecting an output end voltage of the electric generator by means of an output sensing terminal a, and hence, each power generation control device can be used in common irrespective of when a plurality of electric generators are used or when a single electric generator is used alone.

[Explanation of Reference Numerals and Characters]

1 stator coil, 2 field coil, 3 three phase full wave rectifier, 4, 4A power generation control devices, 5 battery, 6 key switch, 7 electric Load, 401 switching transistor, 402 reflux diode, 405 NOR circuit, 406, 407, 420 comparators, 403, 404, 408, 409, 410, 411, 412, 413, 414, 415, 416, 418, 421, 422 resistances, 417 Zener diode, 419, 423 transistors, 424 frequency detection circuit, a, a1, a2, . . . , an output sensing terminals, A, A1, A2, . . . , An output ends, ACG1 main electric generator, ACG2, ACG3, ACGn subordinate electric generators, b, b1, b2, . . . , bn starting terminals, c, c1, c2, . . . , cn external sensing terminals, d, d1, d2, . . . , dn external output terminals, e, f terminals, V reference power supply voltage.

The invention claimed is:

1. A power generation control apparatus configured to drive a plurality of electric generators including a main electric generator and a subordinate electric generator, which are mounted on one internal combustion engine, at the same time by means of said internal combustion engine, characterized by comprising:

a first power generation control device connected to said main electric generator; and a second power generation control device connected to said subordinate electric generator;

wherein said first and second power generation control devices are each provided with:

an external sensing terminal that detects an external voltage of an electric generator to which the external sensing terminal belongs;

an output sensing terminal that detects a power generation voltage generated by said electric generator; and an external output terminal that outputs a signal synchronized with a field current control signal with respect to a field coil of said electric generator;

wherein the power generation voltage of each of said electric generators is regulated to a target voltage value by carrying out field current control in which a field current is supplied to said field coil in an intermittent manner; and wherein when said plurality of electric generators are driven at the same time, the external output terminal of said first power generation control device and the external sensing terminal of said second power generation control device are connected to each other.

2. The power generation control apparatus as set forth in claim 1, characterized in that said second power generation control device detects a field current control signal for said main electric generator by means of the external sensing terminal, and carries out power generation control with respect to said subordinate electric generator in synchronization with the field current control of said main electric generator.

3. The power generation control apparatus as set forth in claim 2, characterized in that said second power generation control device is provided with:

a detection circuit that detects a state of said external sensing terminal; and a change-over circuit that changes over and sets the target voltage value in response to an output potential of said detection circuit;

wherein in cases where it is detected that the field current control signal for said main electric generator is in an interrupted state, the target voltage value of the power generation voltage with respect to the output sensing terminal is changed over to a low voltage.

4. The power generation control apparatus as set forth in claim 2, characterized in that said second power generation control device is provided with a frequency detection circuit that detects a frequency of a field current control signal inputted thereto.

5. The power generation control apparatus as set forth in claim 3, characterized in that said second power generation control device is provided with a frequency detection circuit that detects a frequency of a field current control signal inputted thereto.

6. The power generation control apparatus as set forth in claim 4, characterized in that in cases where the frequency of the detected field current control signal is lower than a predetermined frequency, said frequency detection circuit interrupts the power generation control with respect to said subordinate electric generator for which the field current control is synchronized with that of said main electric generator.

7. The power generation control apparatus as set forth in claim 5, characterized in that in cases where the frequency of the detected field current control signal is lower than a predetermined frequency, said frequency detection circuit interrupts the power generation control with respect to said subordinate electric generator for which the field current control is synchronized with that of said main electric generator.

* * * * *